April 28, 1959     O. F. SCHAPER     2,883,763
CARRIER LANDING TRAINER

Filed Sept. 28, 1956     2 Sheets-Sheet 1

INVENTOR.
OTTO F. SCHAPER

BY *W. R. Maltby*
*Lawrence S. Epstein*
ATTORNEYS

April 28, 1959     O. F. SCHAPER     2,883,763
CARRIER LANDING TRAINER

Filed Sept. 28, 1956     2 Sheets-Sheet 2

INVENTOR.
OTTO F. SCHAPER
BY
ATTORNEYS

United States Patent Office 2,883,763
Patented Apr. 28, 1959

2,883,763
CARRIER LANDING TRAINER
Otto F. Schaper, Port Washington, N.Y.
Application September 28, 1956, Serial No. 612,898
2 Claims. (Cl. 35—12)
(Granted under Title 35, U.S. Code (1952), sec. 266)

The invention described herein may be manufactured and used by or for the Government of the United States of America for governmental purposes without the payment of any royalties thereon or therefor.

This invention relates to visual representation apparatus and especially to television apparatus for visually presenting to an observer a realistic simulation of an environment relative to which the observer is supposedly moving.

The invention will be explained with reference to an embodiment useful in one of its important fields of application, namely, an aircraft-carrier landing trainer for synthetic flight training. However, its use has wide application and is not to be limited to this illustration. For example, the invention may also be employed in connection with other types of flight trainers, automobile driving trainers, etc.

In synthetic flight training, a student pilot is seated in a synthetic flight trainer which simulates the cockpit, instruments and controls of an actual aircraft. His manipulations of the controls produce motions in the trainer and readings on the instruments which correspond to those which would occur if he were manipulating the same controls in the aircraft itself.

To obtain complete realism, however, it is necessary to present to the student a pictorial representation of the scene he would encounter if he were piloting an aircraft.

Various methods of presenting such environmental prospects have been employed. Among them are opaque screens on which the scene is painted, positive color film transparencies on which the scene has been photographically printed, opaque screens on which filmed scenes are projected (single slides or movie film), and scale models surveyed through an optical viewing device.

For best results from such training methods, it is desirable to present to the trainee a wide-angle view of scenes which would be observed by the pilot of an aircraft in flight. The scene should vary in accordance with the trainee's manipulations of the controls of the trainer, and the perspective of objects in the scene should be correct if the training is to be effective. In addition, it is very desirable to be able at will to insert various objects in the simulated environment, or to remove them as, for example, an aircraft carrier in a seascape.

The present invention obtains these desirable results by utilizing a television system to present a picture to an observer. The picture is projected on a large screen facing the observer. The picture is a composite of views photographed by a plurality of television cameras, the composite view being obtained by means of television insertion techniques.

The objects photographed by the cameras consist of scaled models or replicas of actual scenes and objects. The picture on the screen may be varied by altering the relative spacings and orientations of the cameras and their associated replicas.

An important feature of the invention is that the relative spacings and orientations of the cameras and their associated replicas may be motor-actuated in response to manipulations of controls by an observer or by a trainee watching the projected scene from the cockpit of a training device. Thus, the aspect of the projected scene varies just as though the observer were actually piloting an aircraft.

Another important feature of the invention is that proper perspective in the scene can be obtained by correct scaling of the replicas and proper spacing between the projected picture and the observer.

An object of this invention is to visually present to an observer, who is functioning in a simulated situation, a realistic pictorial representation of the scene he would observe in the real situation.

Another object is to visually present to a trainee in a synthetic flight trainer a realistic pictorial representation of an actual flight environment, which varies in accordance with the trainee's manipulations of the trainer's controls.

A further object is to visually present a simulated scene in which objects can be inserted or removed as desired.

Other objects and many of the attendant advantages of this invention will be readily appreciated as the same becomes better understood by reference to the following detailed description when considered in connection with the accompanying drawings wherein.

Figure 1:
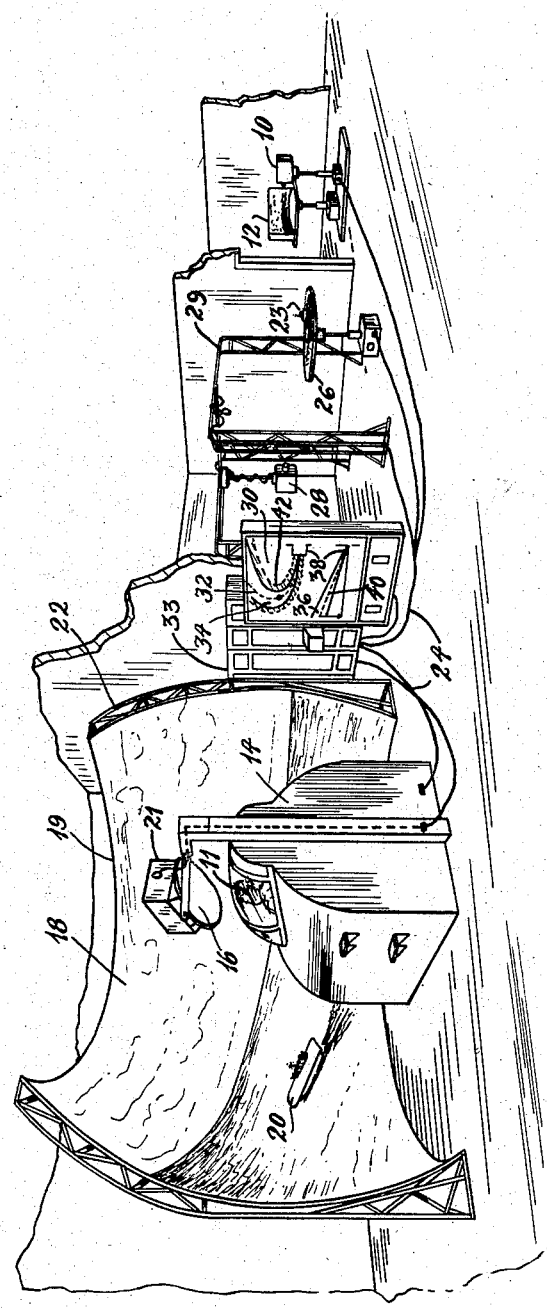
Fig. 1 is a perspective view of an embodiment of the invention.

In Fig. 1, a trainee 11 is seated in the cockpit of an operational flight trainer 14, which faces a wide-angle, curved screen 22. Any operational flight trainer which is capable of furnishing electrical output signals proportional to its speed, height, range, azimuth angle, angle of bank, and angle of pitch, such as the Navy SNJ trainer, may be employed.

The screen 22 may be fabricated from any high reflectance material, such as the beaded fabric commonly used for photographic projection screens. A section of ten-foot radius spherical screen approximately ten feet in height and 100° in horizontal arc has been found satisfactory although these dimensions may be altered. However, a long-radius, large-size type of screen provides a much more realistic picture than smaller screens.

The picture 19, representing the environment in which the trainee 11 is supposed to be flying, is projected on the screen 22 by a pair of wide angle television picture projectors 21, such as the RCA 60° wide angle projector, each projecting approximately half of the scene with a small overlap in the center. The projectors 21 are mounted directly above the trainee's head on a gimbal-supported platform 16. Information on television projection systems may be obtained from such sources as "Practical Television Engineering" by Helt, 2nd edition, section 8.32, published by Rinehart Books, Inc., or "Television Engineering" by Fink, 2nd edition, pages 140–142, published by McGraw-Hill Book Co., Inc. Other references are contained in the last-named book.

Since the invention is being utilized to simulate aircraft carrier landings, the scene 19 is a composite of a seascape 18 and an aircraft carrier 20.

The seascape 18 is obtained by photographing a small painting, or replica, 12 of a seascape with a pair of television cameras, such as image orthicons or vidicons, only one of which, 10, is shown. Each camera is arranged to photograph a different half of the scene 12.

The cameras and the seascape replica 12 are separately mounted and can be azimuthally rotated with respect to each other by a motor (not shown) preferably connected to rotate the replica 12.

The representation of the aircraft carrier 20 is obtained by photographing a scaled model or replica 23 of an aircraft carrier with another television camera 28. The carrier replica 23 is mounted on a support 26 which may be a turntable capable of being azimuthally rotated and vertically positioned by motors (not shown). The camera 28 is suspended from a supporting frame 29 and may be moved toward or away from the carrier replica 23 by means of a motor (not shown). Any other suitable method of mounting the cameras and replicas may be employed.

Each replica and its associated camera or cameras is isolated in a partitioned enclosure or both so that each replica and its background may be lighted independently. Proper lighting of the replicas enables a good composite picture 19 to be obtained.

The camera signals are transferred through wires 24 to a cabinet 33 housing the television circuitry necessary to convert the camera signals into composite video signals which can be utilized by the projectors 21. These circuits, except for the signal insertion circuits, are well known and do not require further description here.

The signal insertion circuits perform the functions of blanking a section of the picture photographed by the seascape camera 10 and inserting in the blanked section the picture of the carrier replica 23 photographed by the carrier camera 28. It should be noted that the outline of the blanked portion is exactly the same as the outline of the inserted carrier picture.

The insertion equipment may comprise the RCA type TA–15A Special Effects Amplifier, for example, a description of which may be obtained from the manual 1B–36081, "Special Effects Amplifier, type TA–15A," published by the Radio Corporation of America. A description of the keyed insertion technique is available in the Nov. 1951 issue of the magazine Tele-Tech in an article by Hurford entitled "Combined Special Effects Amplifier for Television."

One method of obtaining the masking signal used in the blanking of the seascape camera picture is by means of a third camera affixed to the carrier camera 28 so that both cameras move simultaneously and cover exactly the same field of view. Thus, the blanking signals and the signals to be inserted will cover identical picture areas. It is understood, of course, that the scanning of all cameras is synchronized.

Other methods of obtaining the masking signal are also known and may, of course, be employed in preference to the one described above, if so desired.

A plotting board 30 is preferably included in the carrier landing trainer embodiment of the invention. The plotting board 30 is located in the trainer compartment at one side of the trainer 14 in such position that its surface is visible to the trainee 11. On its surface are depicted areas called "cones of allowance" representing the azimuthal 34 and vertical 36 areas within which the trainee must maintain the trainer's flight path to accomplish a safe landing approach to the carrier's flight deck 38. A stylus (not shown) plots the azimuthal and vertical paths, 32 and 40 respectively, of the trainer 14 as the trainee 11 simulates an actual landing on the carrier flight deck 38.

The use of plotting boards in conjunction with operational flight trainers is common. Plotting boards are also known as flight path recorders and a good description of one type of flight path recorder is contained in a publication by the Special Devices Center of the Office of Naval Research entitled "Maintenance Handbook for Radio Aids Unit trailerized, Twin Engine Type Device 1–D–5," NAVEXOS P–1287, starting at page 284.

Figure 2:
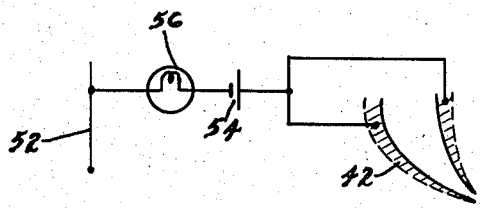
Fig. 2 is a schematic circuit diagram of an off-course warning system employable with the invention.

A valuable variation in the plotting board 30 may be effected by coating the surface of the board on each side of the cone of allowance with a strip of electrically conductive material, indicated by shaded area 42. The stylus 52 (see Fig. 2) may carry an additional metal tip in contact with the board surface and wired in series with one terminal of a dry cell 54 and an alarm device 56, such as a light or a bell. The other terminal of the dry cell may be connected in parallel with each strip of conductive material so that whenever the path of the trainer traverses the limits of the cones of allowance, the trainee 11 receives a warning that he is outside the safe approach zone.

The warning system may be associated with a device, located on the rear deck of the carrier replica 23, which simulates the actual signals given by the landing signal officer on an aircraft carrier when a plane is being brought in for a landing.

Figure 3:
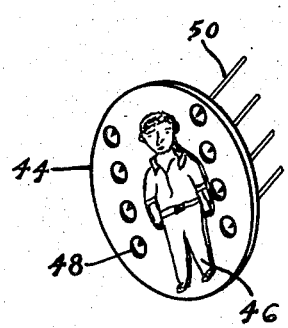
Fig. 3 is a perspective view of a device which may be used with the invention to simulate carrier landing signals.
Figure 4:
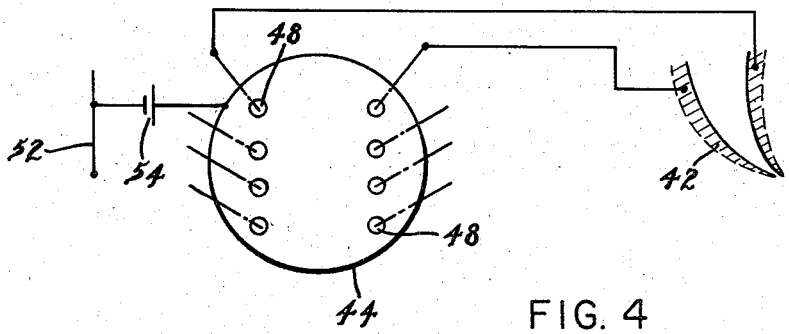
Fig. 4 is a schematic circuit diagram illustrating a method of wiring up the landing signal device of Fig. 3.

Such a landing signal device may be simply a dime-sized metal disc 44 (see Fig. 3) bearing the figure of a man 46 inscribed thereon and a series of holes 48 along the right and left sides. The positions of the holes 48 correspond to the positions in which the landing signal officer places his signal flags in order to give directions to the incoming pilot. The disc 44 is connected in series with the metallic stylus 52 and the dry cell 54 (see Fig. 4).

Each strip of conductive material 42 is connected in series with a different, rigidly supported metallic needle 50, the tip of which is centered in one of the holes 48. When the metalic stylus makes contact with a conductive area 42, sparking occurs between the tip of its associated needle 50 and the sides of the hole in which it is centered. By associating each conductive strip 42 with the proper hole, the proper landing and wave-off signals (in accordance with the position of the trainer with respect to the flight deck of the carrier) can automatically be given.

In operation, the trainee 11 manipulates the trainer controls as though he were actually flying an airplane. Directional signals are derived from devices, such as synchro units, associated with the controls. These directional signals actuate the motors which control the cameras, replicas and gimbal-supported mount for the projectors.

Bank angle and pitch angle signals control the tilt of the gimbal-supported mount 16; azimuth angle signals control the relative azimuthal orientations of seascape replicas 12 and its cameras 10, and carrier support 26 and its camera 28; height signals control the height of the carrier support 26; range signals control the spacing between the carrier support 26 and its camera 28; and speed signals control the rate at which camera 28 approaches the carrier replica 23.

Thus, realistic pictures simulating the landing approach of an aircraft with respect to a carrier flight deck are projected on the screen 22. If the landing-signal-officer simulating device is utilized, the trainee 11 need not observe the plotting board 30 at all but can follow the landing signals which appear to emanate from a landing signal officer on the flight deck of the carrier 20.

Obviously many modifications and variations of the present invention are possible in the light of the above teachings. It is therefore to be understood that within the scope of the appended claims the invention may be practiced otherwise than as specifically described.

What I claim is:

1. In combination with an operational flight training device adapted to produce output signals proportional to the simulated speed, spatial position, azimuth, pitch angle and bank angle of said device produced by manipulations of its controls, apparatus for presenting a pictorial view of a simulated scene comprising: a plurality of television cameras; a plurality of scaled replicas of component objects in said scene, at least one of said replicas associated with each said camera; means electronically combining the output signals of said cameras by signal insertion techniques to produce a composite output signal;

tiltably supported means visually indicating said composite output signal, said visual indication means including at least one television projection device and a wide-angle section of a spehical viewing screen of long radius, on which screen said device projects a television picture; means actuated by the motional and positional output signals of said training device to produce relative movements between said replicas and their associated cameras in accordance with said speed, azimuth and spatial position output signals and to tilt said visual indication means in accordance with said bank and pitch angle output signals; and a signal device comprising a plurality of spacially aligned pairs of indicators, said signal device being viewable from said operational flight trainer whereby the operational flight trainer may be operated in accord with the indication of any pair of indicators.

2. Apparatus in accordance with claim 1, wherein said visual indication means includes two television projection devices each said device projecting approximately half the complete picture.

References Cited in the file of this patent

UNITED STATES PATENTS

| | | |
|---|---|---|
| 545,423 | Chase | Aug. 27, 1895 |
| 1,917,611 | Starr | July 11, 1933 |
| 2,164,297 | Bedford | June 27, 1939 |
| 2,373,313 | Jeandron | Apr. 10, 1945 |
| 2,711,594 | Hickey | June 28, 1955 |
| 2,714,047 | Dehmel | July 26, 1955 |
| 2,737,730 | Spencer | Mar. 13, 1956 |

FOREIGN PATENTS

| | | |
|---|---|---|
| 1,054,244 | France | Oct. 7, 1953 |
| 467,995 | Great Britain | June 28, 1937 |
| 622,312 | Great Britain | Apr. 29, 1949 |
| 739,593 | Great Britain | Nov. 2, 1955 |
| 751,628 | Great Britain | July 4, 1956 |